United States Patent
Gronner et al.

(10) Patent No.: US 9,051,476 B2
(45) Date of Patent: Jun. 9, 2015

(54) POWDER CONTAINING A POLYOXYMETHYLENE POLYMER FOR COATING METALLIC SUBSTRATES

(75) Inventors: Robert M. Gronner, Erlanger, KY (US); Thomas Heyer, Lawrenceburg, IN (US); Hanno Hueckstaedt, Liederbach (DE); Meyer Rosen, Independence, KY (US)

(73) Assignee: Ticona LLC, Florence, KY (US)

( * ) Notice: Subject to any disclaimer, the term of this patent is extended or adjusted under 35 U.S.C. 154(b) by 45 days.

(21) Appl. No.: 13/977,401

(22) PCT Filed: Dec. 22, 2011

(86) PCT No.: PCT/US2011/066740
§ 371 (c)(1),
(2), (4) Date: Oct. 14, 2013

(87) PCT Pub. No.: WO2012/092104
PCT Pub. Date: Jul. 5, 2012

(65) Prior Publication Data
US 2014/0030508 A1    Jan. 30, 2014

Related U.S. Application Data

(60) Provisional application No. 61/428,639, filed on Dec. 30, 2010.

(51) Int. Cl.
C09D 5/03      (2006.01)
B05D 1/24      (2006.01)
C08L 59/02     (2006.01)
C09D 159/02    (2006.01)

(52) U.S. Cl.
CPC .............. C09D 5/037 (2013.01); *Y10T 428/254* (2015.01); *Y10T 428/2982* (2015.01); C08L 59/02 (2013.01); C09D 5/031 (2013.01); C09D 5/033 (2013.01); C09D 159/02 (2013.01); B05D 1/24 (2013.01)

(58) Field of Classification Search
USPC ............... 428/327, 402, 407, 403; 427/185
IPC . C09D 5/03,159/02, 5/031, 5/033, 5/037; C08L 59/02; B05D 1/24
See application file for complete search history.

(56) References Cited

U.S. PATENT DOCUMENTS

| | | |
|---|---|---|
| 3,437,542 A | 4/1969 | Mills et al. |
| 3,528,809 A | 9/1970 | Redmond et al. |
| 3,674,461 A | 7/1972 | Farnand et al. |
| 4,248,379 A | 2/1981 | Hollstein et al. |
| 4,462,919 A | 7/1984 | Saito et al. |
| 4,670,508 A | 6/1987 | Ohdaira et al. |
| 4,731,317 A | 3/1988 | Fromson et al. |
| 4,975,518 A | 12/1990 | Broussard et al. |
| 4,975,519 A | 12/1990 | Yang et al. |
| 4,983,708 A | 1/1991 | Yang et al. |
| 5,004,798 A | 4/1991 | Broussard et al. |
| 5,059,446 A | 10/1991 | Winkle, Sr. et al. |
| 5,070,156 A | 12/1991 | Feldmann et al. |
| 5,096,982 A | 3/1992 | Hesse et al. |
| 5,541,249 A | 7/1996 | Hughes et al. |
| 5,845,837 A | 12/1998 | Gibbs et al. |
| 5,950,063 A | 9/1999 | Hens et al. |
| 6,136,434 A | 10/2000 | Jang et al. |
| 6,777,075 B2 | 8/2004 | Concannon et al. |
| 6,924,077 B2 | 8/2005 | Delp et al. |
| 7,018,760 B2 | 3/2006 | Schultheis et al. |
| 7,049,363 B2 | 5/2006 | Shen |
| 7,074,274 B1 | 7/2006 | Shutic et al. |
| 7,678,311 B2 | 3/2010 | Bolcar |
| 7,968,639 B2 | 6/2011 | Tanimoto et al. |
| 8,133,966 B2 * | 3/2012 | Haubs et al. .................. 528/230 |
| 8,188,211 B2 * | 5/2012 | Haubs et al. .................. 528/425 |
| 8,232,333 B2 | 7/2012 | Haeger et al. |
| 8,329,801 B2 | 12/2012 | Audenaert et al. |
| 8,481,671 B2 * | 7/2013 | Haubs et al. .................. 528/235 |
| 2002/0079416 A1 | 6/2002 | Choji et al. |
| 2003/0066532 A1 | 4/2003 | Gobel |
| 2003/0194554 A1 | 10/2003 | Petersen et al. |
| 2004/0121175 A1 | 6/2004 | Flexman et al. |
| 2004/0220300 A1 | 11/2004 | Valentine et al. |
| 2004/0228971 A1 | 11/2004 | Scaramuzzino |

(Continued)

FOREIGN PATENT DOCUMENTS

| | | |
|---|---|---|
| DE | 1298274 | 6/1969 |
| DE | 20200229 | 4/2002 |

(Continued)

OTHER PUBLICATIONS

PCT/US2011/066740 Search Report and Written Opinion dated Mar. 30, 2012.
Abstract of Chinese Patent No. CN101481567, dated Jul. 15, 2009, 1 page.
Abstract of Chinese Patent No. CN86104520, dated Jan. 24, 1987, 1 page.
Abstract of German Patent No. DE10249453, dated Jun. 18, 2003, 2 pages.
Abstract of German Patent No. DE2031035, dated Dec. 30, 1971, 1 page.
Abstract of Japanese Patent No. JP2000033282, dated Feb. 2, 2000, 2 pages.
Abstract of Japanese Patent No. JP2000080403, dated Mar. 21, 2000, 1 page.
Abstract of Japanese Patent No. JP2003047399, dated Feb. 18, 2003, 1 page.

(Continued)

*Primary Examiner* — Leszek Kiliman
(74) *Attorney, Agent, or Firm* — Dority & Manning, P.A.

(57) ABSTRACT

A powder containing a polyoxymethylene polymer for coating metallic substrates is described. The polymeric particles are made from a polymeric composition containing a polyoxymethylene polymer having functional terminal groups. The polyoxymethylene polymer is blended with at least one functional additive. The functional additive can decrease the stiffness of the polyoxymethylene polymer, can decrease the shrinkage properties of the polyoxymethylene polymer and/ or increase adhesion of the polymer to metal surfaces.

21 Claims, 3 Drawing Sheets

(56) References Cited

U.S. PATENT DOCUMENTS

| | | | |
|---|---|---|---|
| 2004/0229063 | A1 | 11/2004 | Concannon et al. |
| 2005/0123743 | A1 | 6/2005 | Martinazzo |
| 2005/0194711 | A1 | 9/2005 | Choji et al. |
| 2007/0060715 | A1 | 3/2007 | Muck |
| 2008/0029625 | A1 | 2/2008 | Talton |
| 2008/0051517 | A1 | 2/2008 | Okai et al. |
| 2008/0075952 | A1 | 3/2008 | Czornij et al. |
| 2008/0269079 | A1 | 10/2008 | Ballard |
| 2009/0017220 | A1 | 1/2009 | Muller et al. |
| 2009/0050092 | A1 | 2/2009 | Handa et al. |
| 2009/0110833 | A1 | 4/2009 | Wright et al. |
| 2009/0165515 | A1 | 7/2009 | Aoki et al. |
| 2009/0218199 | A1 | 9/2009 | Russell |
| 2010/0021752 | A1 | 1/2010 | Okamura et al. |
| 2010/0072431 | A1 | 3/2010 | Vergelati et al. |
| 2010/0113670 | A1* | 5/2010 | Audenaert et al. ............ 524/425 |
| 2010/0256262 | A1 | 10/2010 | Masaki et al. |
| 2010/0288500 | A1 | 11/2010 | Carlson et al. |
| 2013/0146062 | A1 | 6/2013 | Schumacher et al. |

FOREIGN PATENT DOCUMENTS

| | | | |
|---|---|---|---|
| EP | 2022813 | * | 2/2009 |
| GB | 1054700 | | 1/1967 |
| GB | 1047184 | | 11/1967 |
| JP | 4961283 | | 6/1974 |
| JP | 51532 | | 1/1976 |
| KR | 20050063979 | | 6/2005 |
| WO | WO 99/50339 | | 10/1999 |
| WO | WO 01/68780 | | 9/2001 |
| WO | WO01/68780 | * | 9/2001 |
| WO | WO 02/087339 | | 7/2002 |
| WO | WO 2005/054132 | | 6/2005 |
| WO | WO 2008/044668 | | 4/2008 |
| WO | WO 2009/047102 | | 4/2009 |
| WO | WO 2009/047407 | | 4/2009 |

OTHER PUBLICATIONS

Abstract of Japanese Patent No. JP2004277468, dated Oct. 7, 2004, 2 pages.
Abstract of Japanese Patent No. JP2005305765, dated Nov. 4, 2005, 2 pages.
Abstract of Japanese Patent No. JP2007321113, dated Dec. 13, 2007, 1 page.
Abstract of Japanese Patent No. JP2007321114, dated Dec. 13, 2007, 2 pages.
Abstract of Japanese Patent No. JP2009006294, dated Jan. 15, 2009, 1 page.
Abstract of Japanese Patent No. JPH01210426, dated Aug. 24, 1989, 1 page.
Abstract of Japanese Patent No. JPH06220368, dated Aug. 9, 1994, 1 page.
Abstract of Japanese Patent No. JPH08176118, dated Jul. 9, 1996, 2 pages.
Abstract of Japanese Patent No. JPH08302242, dated Nov. 19, 1996, 1 page.
Abstract of Japanese Patent No. JPH09133134, dated May 20, 1997, 2 pages.
Abstract of Japanese Patent No. JPH0987604, dated Mar. 31, 1997, 1 page.
Abstract of Japanese Patent No. JPH0430629, dated Oct. 29, 1992, 1 page.
Abstract of Japanese Patent No. JPH10130540, date May 19, 1998, 1 page.
Abstract of Japanese Patent No. JPS51132229, dated Nov. 17, 1976, 1 page.
Abstract of Japanese Patent No. JPS5425952, dated Feb. 27, 1979, 1 page.
Abstract of Japanese Patent No. JPS5924752, dated Feb. 8, 1984, 1 page.
Abstract of Japanese Patent No. JPS6059070, dated Apr. 5, 1985, 1 page.
Abstract of Japanese Patent No. JPS61145254, dated Jul. 2, 1986, 2 pages.
Abstract of Japanese Patent No. JPS6227436, dated Feb. 5, 1987, 1 page.
Abstract of Japanese Patent No. JPS63265962, dated Nov. 2, 1988, 1 page.
Abstract of Japanese Patent No. JPS6422934, dated Jan. 25, 1989.
Abstract of Korean Patent No. KR20030013918, dated Feb. 15, 2003, 1 page.
Abstract of Korean Patent No. KR20060011462, dated Feb. 3, 2006, 1 page.
Abstract of Korean Patent No. KR20060119336, dated Nov. 24, 2006, 1 page.

* cited by examiner

FIG. 3

POWDER CONTAINING A POLYOXYMETHYLENE POLYMER FOR COATING METALLIC SUBSTRATES

RELATED APPLICATIONS

The present application claims priority to PCT International Application Serial No. PCT/US2011/066740 filed Dec. 22, 2011 and which claims filing benefit of U.S. Provisional Patent Application Ser. No. 61/428,639 filed on Dec. 30, 2010, which are both hereby incorporated by reference in their entirety.

BACKGROUND

Various metal parts are typically coated with polymers for various reasons. The polymer coating, for instance, can prevent the underlying metal from corroding, especially when the metal part is to be used in a corrosive environment, such as an acidic environment or an alkaline environment.

In one embodiment, the metal parts are powder coated. During powder coating, a hot metal part is dipped into a fluidized bed. The fluidized bed contains fluidized polymer particles that stick to the hot metal part and form a coating.

The polymers that are used to coat the metal parts can vary depending upon the particular application. For example, polyester resins are typically used for outdoor applications. Polyester resins, for instance, have inherent UV stability. Polyester resins can also be formulated so that they will adhere to metal. Polyesters, however, are hydrolytically unstable which limits their use. For instance, polyesters are typically not well suited for use in environments where the polymer must have hot water resistance or chemical resistance, especially resistance to alkaline materials.

For example, many metal coated parts are used in applications where the part is periodically or continuously exposed to hot water, steam and/or corrosive chemicals. Coatings applied to dishwater racks, for instance, need to be stable in hot water environments and in alkaline environments, since dishwater detergents are typically very alkaline. Thus, in the past, polymer coatings containing primarily polyamide 11 or polyamide 12 have been proposed for use as a metal coating in many hot water environments and corrosive environments. Polyamide 11 and polyamide 12, for instance, have adequate mechanical properties such as abrasion resistance and impact strength, and are chemically inert to hydrocarbons, mineral acids, and bases. The use of polyamide 11 and polyamide 12 coatings for metal parts, for instance, are described in U.S. Patent Publication No. 2010/0113670, which is incorporated herein by reference. Resins that contain primarily polyamide 11 and/or polyamide 12, however, are relatively expensive.

Another type of polymer that has excellent mechanical properties and excellent chemical resistance properties are polyoxymethylene polymers. For example, polyoxymethylene polymers do not mechanically or chemically degrade when exposed to hot water, steam, or alkaline compounds. Polyoxymethylene polymers, however, have not been widely used to coat metal parts, since the polymers exhibit poor adhesion to metal surfaces. In addition, the polymers have high stiffness and high shrinkage, which can result in cracking. Once a coating cracks, for instance, the coating has a tendency to flake off easily. Those skilled in the art have attempted to address this problem by combining polyoxymethylene polymers with an assortment of additives. These formulations, however, have met with little success.

In view of the above, a need exists for a polymer composition containing a polyoxymethylene polymer that can be used to powder coat metal substrates.

SUMMARY

The present disclosure is generally directed to a powder comprised of polymeric particles that contain primarily a polyoxymethylene polymer. As will be described in greater detail below, the powder is particularly well suited for use in coating metallic substrates. For example, the powder can have a particle size distribution and can be made from a polymer composition that not only makes the powder well suited for use in fluidized bed processes, but also has good adhesion to metal surface properties. In general, the polymer particles are made from a polyoxymethylene polymer having reactive end groups, such as hydroxyl groups. The polyoxymethylene polymer is combined with at least one functional additive that can decrease the stiffness of the polymer, decrease the shrinkage properties of the polymer, and/or increase the ability of the polymer to adhere to metal.

In one embodiment, for instance, the present disclosure is directed to a powder well suited for powder coating metallic substrates. The powder comprises polymeric particles having a particle size distribution such that at least about 80% of the particles have a particle size of from about 25 microns to about 300 microns. The polymeric particles comprise a polyoxymethylene polymer. More particularly, the polyoxymethylene polymer comprises a polyoxymethylene in which at least about 50% of the terminal groups are functional groups, such as hydroxyl groups. For instance, at least about 70% of the terminal groups can be hydroxyl groups, such as at least about 80% of the terminal groups can be hydroxyl groups, such as at least about 85% of the terminal groups can be hydroxyl groups. In one embodiment, for instance, each individual polymer chain of the polyoxymethylene polymer can comprise between about 15 and about 20 terminal hydroxyl groups.

The polymeric particles also contain a functional additive combined with the polyoxymethylene polymer. In certain embodiments, the functional additive can be coupled to the polyoxymethylene polymer through ionic bonding, covalent bonding, grafting, linking, or in any other similar way. The functional additive can be present in the polymeric particles in an amount from about 5% by weight to about 50% by weight, such as in an amount from about 10% by weight to about 30% by weight. In one embodiment, the functional additive may comprise a thermoplastic elastomer, such as a thermoplastic polyurethane elastomer. When the functional additive comprises a thermoplastic elastomer, a coupling agent may also be present in the composition, such as an isocyanate.

In an alternative embodiment, the functional additive may comprise a polyamide 11 polymer and/or a polyamide 12 polymer. The polyamide 11 or 12 polymer may comprise a condensation product of ricinoleic acid.

In yet another embodiment, the functional additive may comprise a polyamide terpolymer or a polyamide copolymer. The polyamide terpolymer, for instance, may include three or more repeat units of polyamide 6; polyamide 11; polyamide 12; polyamide 6,6; polyamide 6,9; polyamide 6,10; or polyamide 6,12. The polyamide copolymer, on the other hand, may comprise a thermoplastic polyamide, such as a polycondensation product of polymeric fatty acids with aliphatic diamines.

In an alternative embodiment, the functional additive may comprise an ionomer. For instance, the functional additive may comprise a zinc ionomer of an ethylene methacrylic acid copolymer.

In other embodiments, any of the above described functional additives may be combined together and blended with the polyoxymethylene polymer.

The functional additive for blending with the polyoxymethylene polymer generally has a relatively low melting point. For example, the melting point of the functional polymer can be generally below about 220° C., such as from about 90° C. to about 200° C., such as from about 150° C. to about 200° C. The polymer composition used to form the polymeric particles can generally have an elastic modulus of less than about 2200 MPa, such as less than about 2000 MPa, such as less than about 1800 MPa. The polymer composition can also have a shrinkage of less than about 1.8%, such as less than about 1.7%, such as less than about 1.6%.

As described above, the powder has a particle size distribution well suited for use in fluidized beds. In one embodiment, for instance, at least 90% of the polymeric particles can have a particle size of from about 100 microns to about 250 microns, such as from about 100 microns to about 200 microns. In order to produce particles having the desired size, the polymer composition can be ground and then filtered through appropriate screens. In one embodiment, the polymer composition can be cryogenically ground.

The present disclosure is also directed to metallic substrates coated with the polymer powder and to a process for coating metallic substrates. The process includes the steps of placing a heated metallic substrate into a fluidized bed containing the polymeric particles of the present disclosure. Once the metallic substrate is coated, in one embodiment, the coated metallic substrate can be removed from the fluidized bed and then further heated in order to further promote a uniform coating over the surface of the part.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polymer composition containing a polyoxymethylene polymer and one or more functional additives. The polymer composition can be ground into a powder containing polymeric particles. In accordance with the present disclosure, the powder is well suited to powder coating metal substrates.

More particularly, the polymer composition contains a polyoxymethylene polymer having reactive end groups. It has been discovered that the combination of a polyoxymethylene polymer with reactive end groups and one or more functional polymers as will be described in greater detail below produces a composition having better adhesive properties to metal surfaces. The one or more functional additives can also decrease the stiffness of the polyoxymethylene polymer and decrease shrinkage of the polymer. Thus, the polymer composition not only adheres well to metal surfaces, but also resists cracking and flaking. Of particular advantage, since the polymer composition contains significant amounts of a polyoxymethylene polymer, the composition is also well suited for use in environments where the coated metal part may be exposed to hot water or steam. The composition is also chemical resistant and can be used in environments where exposure to alkaline compounds is expected. In this regard, metal coated parts made in accordance with the present disclosure are particularly well suited for use in dishwashers, washing machines, industrial washing systems, industrial fabric scouring systems, and the like.

As described above, the polyoxymethylene polymer for use in the present disclosure includes reactive end groups. In one embodiment, the polyoxymethylene polymer is also a copolymer. As used herein, the term "copolymer" is intended to encompass any polymer having, as at least part of the polymer chain, structural units derived from trioxane and cyclic formals or their functionalized derivatives. Thus, the term "copolymer" as used herein is intended to encompass terpolymers, tetrapolymers, and the like that include structural units in the polymer chain derived from trioxane and cyclic formals or their functionalized derivatives in addition to other units, if present during polymerization. For instance, other units can be derived from trioxane or a mixture of trioxane and dioxolane and cyclic formals, e.g., cyclic ether and cyclic acetal monomers.

A copolymerization process can include synthesis of the polyoxymethylene-forming monomers. For instance, trioxane can first be formed by the trimerization of formaldehyde in an aqueous phase, and subsequent separation and purification of the formed monomer.

In one embodiment, a polyoxymethylene copolymer can be manufactured by the copolymerization of trioxane with 0.2 to 6 parts per 100 parts of trioxane of cyclic acetal containing at least one $O(CH2)_n$, group where n>1. In general, the polyoxymethylene copolymer can include at least 50 mol-%, such as at least 75 mol-%, such as at least 90 mol-% and such as even at least 95 mol-% of —$CH_2O$-repeat units.

The copolymerization can be initiated by cationic initiator as is generally known in the art, such as organic or inorganic acids, acid halides, and Lewis acids. One example of the latter is boron fluoride and its coordination complexes with organic compounds in which oxygen or sulfur is the donor atom. The coordination complexes of boron trifluoride may, for example, be a complex with a phenol, an ether, an ester, or a dialkyl sulfide. Boron trifluoride etherate ($BF_3.Et_2O$) is one preferred coordination complex useful in the cationic copolymerization processes. Alternately, gaseous $BF_3$ may be employed as the polymerization initiator.

Catalyst concentration may be varied within wide limits, depending on the nature of the catalyst and the intended molecular weight of the copolymer. For example, catalyst concentration may range from about 0.0001 to about 1 weight percent, and in one embodiment can range from about 0.001 to about 0.1 weight percent, based on the total weight of the monomer mixture.

A chain transfer agent can also be utilized during polymerization of the monomers. In general, a relatively small amount of a chain transfer agent can be used, e.g., about 100 to about 1000 ppm.

In one embodiment, the chain transfer agent can be an acetal such as methylal, butylal, mixtures of acetals, and the like. Other typical chain transfer agents such as esters or alcohols including methyl formate, methanol, and so forth may be used.

The polyoxymethylene polymer further includes functional groups. For instance, a polyoxymethylene copolymer can be formed to include terminal groups, which can include both end group and side or pendant functional groups, such as hydroxyl groups, so as to further improve the adhesion of the polymer to metal surfaces. In one embodiment, terminal groups can also provide binding sites for formation of bonds with the functional additives.

According to one embodiment, a polyoxymethylene copolymer can be formed to include a relatively high number of terminal hydroxyl groups on the copolymer. For example, the polyoxymethylene copolymer can have terminal hydroxyl groups, for example hydroxyethylene groups and/or hydroxyl groups, in greater than about 50% of all the terminal sites on the polymer, which includes both polymer end groups and terminal side, or pendant, groups. For instance, greater than about 70%, greater than about 80%, or greater than about 85% of the terminal groups on the polyoxymethylene copolymer may be hydroxyl groups, based on the total number of terminal groups present. In one embodiment, up to about 90%, or up to about 85% of the terminal groups on the polyoxymethylene copolymer may be hydroxyl groups. In one preferred embodiment, a polyoxymethylene copolymer can include up to about 20 hydroxyl groups per polymer chain, for instance, between about 15 and about 20 hydroxyl groups per chain.

The polyoxymethylene copolymer can have a content of terminal hydroxyl groups of at least about 5 mmol/kg, such as at least about 10 mmol/kg, such as at least about 15 mmol/kg. For example, the terminal hydroxyl group content ranges from about 18 to about 50 mmol/kg.

A polyoxymethylene copolymer can be formed to include a high percentage of terminal hydroxyl groups through selection of the chain transfer agent used during polymerization. For instance, a glycol chain transfer agent such as ethylene glycol, diethylene glycol, mixtures of glycols, and the like can be used in a copolymerization of trioxane with a cyclic acetal containing at least one $O(CH2)_n$ group where n>1. According to this embodiment, greater than about 80%, for instance greater than about 85% of the terminal end groups on the formed polyoxymethylene copolymer can be ethoxyhydroxy or —$OCH_2CH_2OH$ (—$C_2OH$) end groups. This type of polyoxymethylene copolymer (i.e., trioxane copolymerized with a cyclic acetal in the presence of an ethylene glycol chain transfer agent) is referred to throughout this disclosure as polyoxymethylene-OH.

A polyoxymethylene copolymer can be formed from polymerization of one or more monomers that can produce on the copolymer various terminal groups that can provide desirable characteristics to the resulting polymer composition. For example, a copolymer can be formed so as to include terminal and/or pendant groups including, without limitation, alkoxy groups, formate groups, acetate groups and/or aldehyde groups. The terminal groups can be functional as formed, and can provide bonding sites for bonding with one or more components. Alternatively, the formed copolymer can be further treated to form functional groups. For example, following formation, the copolymer can be subjected to hydrolysis to form the desired terminal groups on the copolymer.

Any of a variety of different monomers can be copolymerized with one or more other polyoxymethylene-forming monomers, e.g., trioxane. Monomers can include, without limitation, cyclic formals having pendant acrylate or substituted acrylate ester groups, cyclic ethers, cyclic acetals, and so forth. By way of example, trioxane can be copolymerized with 1,2,6-hexanetriol formal or its ester derivatives, as described in U.S. Pat. No. 4,975,518 to Broussard, et al.; ester derivatives glycerol formal, as described in U.S. Pat. No. 4,975,519 to Yang, et al.; glycidyl ester derivatives, as described in U.S. Pat. No. 4,983,708 to Yang, et al.; and trimethylolpropane formal derivatives, as described in U.S. Pat. No. 5,004,798 to Broussard, et al. (all patents are incorporated herein by reference). Monomers can include, without limitation, $\alpha,\alpha$- and $\alpha,\beta$-isomers of glycerol formal, such as glycerol formal acetate (GFA), glycerol formal methacrylate, glycerol formal crotanate, and glycerol formal chloracetate; glycerol formal formate (GFF); 1,2,6-hexanetriol formal acetate; glycidyl acrylate; 5-ethyl-5-hydroxymethyl-1,3-dioxane (EHMDO); EHMDO ester of acetic acid; EHMDO ester of acrylic acid; EHMDO ester of 3-choro-propanoic acid; EHMDO ester of 2-methylacrylic acid; EHMDO ester of 3-methylacrylic acid; EHMDO ester of undedocenoic acid; EHMDO ester of cinnamic acid; EHMDO ester of 3,3-dimethylacrylic acid; and so forth.

A monomer can include a terminal group that is much less reactive during polymerization as compared to the formal group itself or the trioxane, e.g., an ester group, a formate group, or an acetate group. Accordingly, the terminal group can remain unreacted during polymerization to form an essentially linear polymer with side chain functionality. This side chain functionality can be suitable for use as is or, alternatively, can be hydrolyzed following polymerization to yield pendant hydroxyl functional groups. Hydrolysis following polymerization can also remove unstable hemiacetal end groups and improve the stability of the resulting copolymers.

In one preferred embodiment, a polyoxymethylene copolymer can be formed via the copolymerization of trioxane with between about 0.2 and about 6 parts GFF per 100 parts trioxane or 0.2 to 6 parts of a combination of 1,3-dioxolane and GFF per 100 parts trioxane, using ethylene glycol as the chain transfer agent. This copolymer, following hydrolysis, can have about 80% or higher —$C_2OH$ end groups and up to 20 to 30 pendant —OH groups per chain. This copolymer is referred to throughout this disclosure as lateral-OH polyoxymethylene.

Multiple monomers may be employed in forming the disclosed copolymers so as to form tri- or tetra-polymers. For instance, a trioxane can be polymerized with a mixture of dioxolane and one or more of the cyclic formals described above. Additional monomers as are generally known in the art can be incorporated in disclosed copolymer. Exemplary monomers can include ethylene oxide, 1,3-dioxolane, 1,3-dioxepane, 1,3-dioxep-5-ene, 1,3,5-trioxepane, and the like.

The polymerization can be carried out as precipitation polymerization or in the melt. By a suitable choice of the polymerization parameters, such as duration of polymerization or amount of chain transfer agent, the molecular weight and hence the melt index value of the resulting polymer can be adjusted. The target melt index of a polyoxymethylene copolymer can be between about 2 decigrams per minute (dg/min) and about 30 dg/min, between about 5 dg/min and about 20 dg/min, or between about 8 dg/min and about 10 dg/min.

The amount of the polyoxymethylene copolymer present in a polymer composition can vary. In one embodiment, for instance, the composition contains the polyoxymethylene copolymer in an amount of at least about 40% by weight, such as in an amount greater than about 60% by weight, such as in an amount greater than about 65% by weight, such as in an amount greater than about 70% by weight. In general, the polyoxymethylene copolymer is present in an amount less than about 95% by weight, such as in an amount less than about 90% by weight, such as in an amount less than about 85% by weight.

As described above, a polyoxymethylene polymer having functional terminal groups has been found to have improved adhesive strength between the polymer and metal surface. In addition to using a polyoxymethylene with functional terminal groups, the composition further includes one or more functional additives. The functional additives can be present in the composition in order to alter one or more properties of the polyoxymethylene polymer. The functional additive, for instance, may be included in the composition in order to lower the stiffness of the polyoxymethylene polymer and/or lower the shrinkage characteristics of the polymer. Reducing the modulus of elasticity and shrinkage prevents the coating from later cracking and flaking off. One or more functional additives may also, be present in the composition in order to further increase adhesion to a metal surface.

Functional additives that may be incorporated into the composition generally include lower melting point polymers. The polymers, for instance, can have a melting point generally less than 210° C., such as from about 90° C. to about 200° C. In one embodiment, for instance, a functional polymer may be selected that has a melting point of from about 150° C. to about 200° C. In addition, the functional additive may also be comprised of polar molecules. In one embodiment, for instance, the functional additive has greater polarity and functionality than the polyoxymethylene polymer. The functional additive selected, however, should also still allow for the composition to be ground into a powder having the appropriate particle size distribution and should not substantially degrade the resistance of the polyoxymethylene polymer to hot water and alkaline chemistries.

Functional additives that may be incorporated into the polymer composition, for instance, include thermoplastic elastomers, lower melting point polyamides, polyamide terpolymers, polyamide copolymers, ionomers, and mixtures thereof. In addition, the composition may optionally include one or more coupling agents. A coupling agent may be included in the composition in order to couple at least one functional additive to the polyoxymethylene polymer. In this regard, functional additives may also be selected that form an attachment with the polyoxymethylene polymer through covalent bonds, grafting, ionic bonds, or through any suitable linking mechanism.

In general, the one or more functional additives may be present in the composition in an amount from about 5% to about 50% by weight. In one embodiment, for instance, the functional additives may be present in the composition in an amount from about 10% to about 30% by weight.

As described above, one type of functional additive that may be included in the polymer composition is a thermoplastic elastomer. In one embodiment, the thermoplastic elastomer may include reactive groups that directly or indirectly attach to reactive groups contained on the polyoxymethylene polymer. For instance, in one embodiment, the thermoplastic elastomer may have active hydrogen atoms which allow for covalent bonds to form with the hydroxyl groups on the polyoxymethylene polymer when a coupling agent is employed.

Thermoplastic elastomers are materials with both thermoplastic and elastomeric properties. Thermoplastic elastomers include styrenic block copolymers, polyolefin blends referred to as thermoplastic olefin elastomers, elastomeric alloys, thermoplastic polyurethanes, thermoplastic copolyesters, and thermoplastic polyamides.

Thermoplastic elastomers well suited for use in the present disclosure are polyester elastomers (TPE-E), thermoplastic polyamide elastomers (TPE-A) and in particular thermoplastic polyurethane elastomers (TPE-U). The above thermoplastic elastomers have active hydrogen atoms which can be reacted with the coupling reagents and/or the polyoxymethylene polymer. Examples of such groups are urethane groups, amido groups, amino groups or hydroxyl groups. For instance, terminal polyester dial flexible segments of thermoplastic polyurethane elastomers have hydrogen atoms which can react, for example, with isocyanate groups.

In one particular embodiment, a thermoplastic polyurethane elastomer is used as the functional additive either alone or in combination with other functional additives. The thermoplastic polyurethane elastomer, for instance, may have a soft segment of a long-chain dial and a hard segment derived from a diisocyanate and a chain extender. In one embodiment, the polyurethane elastomer is a polyester type prepared by reacting a long-chain diol with a diisocyanate to produce a polyurethane prepolymer having isocyanate end groups, followed by chain extension of the prepolymer with a diol chain extender. Representative long-chain diols are polyester diols such as poly(butylene adipate)diol, polyethylene adipate)diol and poly($\epsilon$-caprolactone)diol; and polyether diols such as poly(tetramethylene ether)glycol, poly(propylene oxide)glycol and poly(ethylene oxide)glycol. Suitable diisocyanates include 4,4'-methylenebis(phenyl isocyanate), 2,4-toluene diisocyanate, 1,6-hexamethylene diisocyanate and 4,4'-methylenebis-(cycloxylisocyanate). Suitable chain extenders are $C_2$-$C_6$ aliphatic dials such as ethylene glycol, 1,4-butanediol, 1,6-hexanedial and neopentyl glycol. One example of a thermoplastic polyurethane is characterized as essentially poly (adipic acid-co-butylene glycol-co-diphenylmethane diisocyanate).

In general, the thermoplastic elastomer may be present in the composition in the amounts described above. In one embodiment, for instance, the thermoplastic elastomer may be present in the composition in an amount greater than about 10% by weight and in an amount less than about 30% by weight. For instance, the thermoplastic elastomer may be present in an amount from about 15% to about 25% by weight.

As described above, the thermoplastic elastomer may be used with a coupling agent. The coupling agent can be capable of coupling the functional additive to the polyoxymethylene polymer. In order to form bridging groups between the polyoxymethylene polymer and the functional additive, a wide range of polyfunctional, such as trifunctional or bifunctional coupling agents, may be used. The coupling agent may be capable of forming covalent bonds with the terminal hydroxyl groups on the polyoxymethylene polymer and with functional groups on the functional additive. In this manner, the impact modifier becomes coupled to the polyoxymethylene through covalent bonds.

In one embodiment, the coupling agent comprises a diisocyanate, such as an aliphatic, cycloaliphatic and/or aromatic diisocyanate. The coupling agent may be in the form of an oligomer, such as a trimer or a dimer.

In one embodiment, the coupling agent comprises a diisocyanate or a triisocyanate which is selected from 2,2'-, 2,4'-, and 4,4'-diphenylmethane diisocyanate (MDI); 3,3'-dimethyl-4,4'-biphenylene diisocyanate (TODD; toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI);

triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanatomethyl-3,5,5-trimethylcyclo-hexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

In one embodiment, an aromatic polyisocyanate is used, such as 4,4'-diphenylmethane diisocyanate (MDI).

When present, the coupling agent can be present in the composition in an amount generally from about 0.1% to about 5% by weight. In one embodiment, for instance, the coupling agent can be present in an amount from about 0.1% to about 2% by weight, such as from about 0.2% to about 1% by weight. In an alternative embodiment, the coupling agent can be added to the polymer composition in molar excess amounts when comparing the reactive groups on the coupling agent with the amount of terminal hydroxyl groups on the polyoxymethylene polymer.

In an alternative embodiment, the functional additive may comprise a polyamide. The polyamide may be used alone or in combination with a thermoplastic elastomer. In one embodiment, for instance, a relatively low melting point polyamide is incorporated into the polymer composition. In one embodiment, for instance, the polymer composition may contain polyamide 11, polyamide 12, or mixtures thereof. Polyamide 11 comprises a polymer condensation product of 11-aminoundecanoic acid or of lactam-11. Polyamide 12, on the other hand, can be obtained by condensation of 12-admin-nododecanoic acid or of lactam-12. In one particular embodiment, for instance, one or more of the above polyamide polymers may be obtained by condensation polymerization using ricinoleic acid. For example, polyamide 11 may be obtained by condensation polymerization of ricinoleic acid with 11-aminoundecanoic acid.

Polyamide 11 and/or polyamide 12 may be present in the polymer composition in the amounts indicated above with respect to the functional additives. In one embodiment, for instance, the polymers may be present in the composition in an amount greater than 10% by weight and in an amount less than about 30% by weight.

In another embodiment of the present disclosure, the functional additive may comprise a polyamide terpolymer or polyamide copolymer. As used herein, a polyamide terpolymer refers to a polymer composed of three or more distinct repeat units. For example, the polyamide terpolymer may comprise a terpolymer composed of three or more repeat units of polyamide 6; polyamide 11; polyamide 12; polyamide 6,6; polyamide 6,9; polyamide 6,10; or polyamide 6,12. In one embodiment, for instance, a polyamide terpolymer is used that is composed of three repeat units including polyamide 6; polyamide 6,6; and polyamide 12. The polyamide terpolymer may have a melting point in the range of from about 120° C. to about 220° C., such as from about 150° C. to about 165° C. The polyamide terpolymer may be present in the composition in any of the amounts described above with respect to the other functional additives.

Polyamide copolymers that may be used in the polymeric composition generally include copolymers having a melting point of less than about 200° C. Polyamide copolymers that are well suited for use in the present disclosure include thermoplastic polyamides that, in one embodiment, comprise the polycondensation product of polymeric fatty acids with aliphatic diamines.

In yet another embodiment, the functional additive may comprise an ionomer. The ionomer, for instance, can generally have a melting point of less than about 200° C., such as from about 90° C. to about 180° C. Such polymers include ethylene methacrylic acid ionomers and/or ethylene acrylic acid ionomers. In one particular embodiment, for instance, the functional additive may comprise a zinc ionomer comprising an ethylene-methacrylic acid copolymer.

As described above, the polymer composition of the present disclosure can contain a single functional additive or can comprise a mixture of functional additives. For example, any of the functional additives described above can be blended together and combined with the polyoxymethylene polymer.

In addition to the polyoxymethylene polymer and one or more functional additives, the polymer composition may also contain various other components. In one embodiment, a formaldehyde scavenger may also be included in the composition. The formaldehyde scavenger, for instance, may be amine-based and may be present in an amount less than about 1% by weight.

The polymer composition of the present disclosure can optionally contain a stabilizer and/or various other known additives. Such additives can include, for example, antioxidants, acid scavengers, UV stabilizers or heat stabilizers. In addition, the composition may contain processing auxiliaries, for example adhesion promoters, lubricants, nucleating agents, fillers, reinforcing materials or antistatic agents and additives which impart a desired property to the material.

In general, other additives can be present in the polymer composition in an amount up to about 10% by weight, such as from about 0.1% to about 5% by weight, such as from about 0.1 to about 2% by weight.

When forming a powder for powder coating metallic substrates, the above described components can be melt blended together. In one embodiment, melt blending the components together can cause a reaction to occur between the polyoxymethylene polymer and the one or more functional additives. In one embodiment, for instance, the coupling agent may attach one or more functional additives to the polyoxymethylene polymer.

In one embodiment, the components in the composition are mixed together and then melt blended in an extruder. Processing temperatures can vary from about 100° C. to about 240° C., and particularly from about 165° C. to about 200° C. The duration of mixing can be from about 0.5 minutes to about 60 minutes.

Extruded strands can be produced which are then pelletized. Next, the pelletized compound can be ground to a suitable particle size and to a suitable particle size distribution to produce a powder that is well suited for use in fluidized applications.

In one embodiment, any suitable hammermill or granulator may be used to reduce the particle size. In one particular embodiment, however, cryogenic grinding is used to reduce the size of the particles. In some embodiments, for instance, the polymer composition may tend to be relatively soft and therefore cryogenic grinding can be used to not only obtain the desired reduced particle size, but also to obtain particles that are approximately spherical in size and having an appropriate particle size distribution.

For example, in one embodiment, the polymeric particles of the powder can have a particle size distribution such that at least about 80% of the particles have a particle size of from about 25 microns to about 300 microns, and particularly from about 50 microns to about 250 microns. In one embodiment, for instance, at least about 90% of the particles have a particle size of from about 100 microns to about 250 microns, such as from about 100 microns to about 200 microns. Larger particles, for instance, have a tendency not to coat metallic substrates through a fluidized bed process and can be difficult to fluidize. Smaller particles, on the other hand, can cause the formation of static electricity, resulting in the need for an anti-static agent.

During cryogenic grinding, the polymer pellets are kept at very low temperatures and then processed in a grinding device, such as in a hammermill or a granulator. The temperature of the pellets can be reduced using various methods. In one embodiment, for instance, the temperature of the pellets is reduced by contact with liquid nitrogen. In other embodiments, the pellets can be refrigerated.

In one particular embodiment, for instance, a cryogenic liquid, such as liquid nitrogen, is directly injected in with a gas flow to pre-cool the pellets before the pellets enter the impact area of the mill. The cryogenic liquid also cools the mill as the polymer composition is ground. The liquid nitrogen, for instance, may be at a temperature of less than about −129° C., such as at a temperature of less than about −180° C.

After grinding, the polymer particles may be filtered through a screen and also fed through a cyclone, powder collection and a bag house to separate fines from the gas flow. The screen, for instance, may have a 50 mesh size to ensure that the particles have a particle size of less than about 300 microns. The cyclone, on the other hand, may remove fines, such as particles having a size of less than about 50 microns. In one particular embodiment, for instance, the resulting powder may contain particles having a size between about 100 microns and about 200 microns.

After the powder is produced and collected, the powder can then be loaded into a fluidized bed and fluidized using a suitable gas flow. For instance, nitrogen gas, air or any other suitable gas may be used to fluidize the bed. A metal substrate is then preheated to a temperature sufficient to cause the polymer particles to stick to the surface of the metal substrate and flow forming a coating. The metal substrate, for instance, may be heated to a temperature greater than about 250° C., such as greater than about 220° C., such as greater than about 240° C. and at a temperature generally less than about 300° C. The metal substrate is maintained in the fluidized bed until a sufficient amount of polymer particles have become attached to the metal part in order to form a continuous coating.

In one embodiment, after the coated metal substrate is removed from the fluidized bed, the coated metal substrate is further heated and/or annealed in an oven. Heating the coated metal substrate may further cause the polymer composition to flow and evenly coat the surface of the metal substrate. The thickness of the coating applied to the metal substrate can vary depending upon the particular application. In one embodiment, for instance, the coating can have a thickness of from about 0.01 mm to about 1 mm, such as from about 0.1 mm to about 0.5 mm. The coating, however, in other applications may be greater than 1 mm, such as from about 1 mm to about 3 mm depending upon the end use of the coated metallic part.

In addition to coating metallic parts using a fluidized bed, metallic substrates can also be coated using electrostatic coating techniques.

Polymeric particles made in accordance with the present disclosure are well suited for use in coating metallic substrates. In fact, the composition of the present disclosure offers various advantages and benefits, especially when coating metallic substrates for use in corrosive environments. For example, due to the amount of polyoxymethylene polymer present in the polymer particles, the particles are capable of forming coatings that do not degrade when exposed to higher temperatures, hot water, and/or steam. Further, the coatings are resistant to chemical attack. The coatings, for example, are particularly resistant to alkaline compounds.

Since the polyoxymethylene polymer has functional terminal groups, the polymer has been found to have improved adhesion to metal surfaces. The one or more functional additives blended with the polyoxymethylene polymer can serve to further improve adhesion. The one or more functional additives can also lower the stiffness of the material and thus make coatings made according to the present disclosure resist cracking. For instance, coatings made according to the present disclosure can have a modulus of elasticity of generally less than about 2200 MPa, such as less than about 2000 MPa, such as less than about 1800 MPa. The modulus of elasticity of the coatings is generally greater than 1200 MPa, such as greater than about 1500 MPa. Modulus is determined according to ISO 527.

The one or more functional additives can also improve the shrinkage properties of the polyoxymethylene polymer. Compositions made according to the present disclosure, for instance, may display shrinkage values of less than about 1.8%, such as less than about 1.7%, such as less than about 1.6%. The shrinkage of the polymer is generally greater than about 1%, such as greater than about 1.2%. Shrinkage is determined according to ASTM Test D955 (ISO 2577).

The present disclosure may be better understood with reference to the following example.

EXAMPLE

The following experiments were conducted in order to show some of the benefits and advantages of compositions made according to the present disclosure.

The following polymer compositions were formulated and tested:

Sample No. 1: Sample No. 1 only contained a polyoxymethylene polymer. The polyoxymethylene polymer comprised a polyoxymethylene polymer with functional terminal groups, namely hydroxyl groups. In particular, approximately 20% to 25% of the terminal groups on the polymer were hydroxyl groups.

Sample No. 2: A polyoxymethylene polymer having about 80% to 85% hydroxyl terminal groups was combined with 5% by weight of a thermoplastic polyurethane elastomer and 0.5% by weight of a coupling agent. The thermoplastic polyurethane elastomer was obtained from BASF under the trade name ELASTOLLAN. The coupling agent used was 4,4'-diphenylmethane diisocyanate.

Sample No. 3: The polyoxymethylene polymer described in Sample No. 2 above was combined with 18% by weight of the thermoplastic polyurethane elastomer and 0.5% by weight of the coupling agent.

Sample No. 4: This sample contained 90% by weight of the polyoxymethylene polymer described in Sample No. 1 above and 10% by weight polyamide 11.

Sample No. 5: This sample contained 90% by weight of the polyoxymethylene polymer described in Sample No. 1 above and 10% by weight polyamide 12.

Control No. 1: This sample contained polyamide 11.
Control No. 2: This sample contained polyamide 12.

The compositions represented by Sample No. 1 through Sample No. 5 were then ground into a powder having a particle size distribution of between about 50 microns and 250 microns. The polymer compositions were ground to be substantially similar to the powders described above with respect to Control No. 1 and Control No. 2. In order to grind the samples, a commercial disk mill was used with a 50 mesh screen. All of the samples were cryogenically ground by contacting the pellets with liquid nitrogen prior to grinding.

All of the above powders were then placed in a small laboratory fluid bed for coating experiments. The fluidized bed apparatus was cylindrical in shape having a height of 13 inches and a diameter of 8 inches. A gas inlet valve was located on the side near the bottom of the column. Above the valve inlet, an ultrahigh molecular weight polyethylene frit (20 micron pore size) was fitted for gas distribution. The top of the cylinder was open to the atmosphere.

Each sample powder was loaded into the fluidized bed at a depth of from 4 inches to 5 inches. Nitrogen was fed to the fluidized bed sufficient to expand the bed about 1 inch in height and give the appearance of gentle boiling on the surface of the bed. For powders that contained smaller particles, an anti-static powder was added. The anti-static powder used was either graphite or fumed silica at amounts less than 1% by weight. For particle size distributions between 100 microns and 200 microns, an anti-static powder was not required.

Plaques made of carbon steel were coated in the fluidized bed. The plaques had a size of 76 mm×127 mm×0.73 mm. A hole was drilled near the edge at the center of the length dimension to insert a hang wire. The plaques were washed in acetone, wiped dry with a lint-free wipe, washed a second time with acetone, and air dried to clean the surface of any grease. The plaques were then heated to a temperature of 380° C. for 10 minutes and immediately dipped in the fluidized bed for 3 seconds. After removal from the fluidized bed, the coated plaques were placed in a second oven at a temperature of from about 200° C. to about 210° C. for 2 minutes to allow the powder coat to flow and set on the surface of the plaque. After 2 minutes in the oven, the plaque was air cooled to room temperature prior to any testing. A uniform, relatively smooth coating was formed on the plaques.

The following tests were then performed on the coated plaques:

Two ASTM tests were employed to assess the adhesion of the coatings on the plaques. The first test is ASTM D3359, which is an X-Cut Adhesion Tape Pull-Off Test. This test is semi-quantitative. In it, the test specimen coating is cut with a razor down to the steel with two lines forming an "X". The lines are ~40 mm long, and the internal angle of the intersection is between 30 and 45°. An adhesive tape marketed specifically for this test is applied across the "X" and sets for 90 seconds. At that point the tape is rapidly (but smoothly) removed at an angle close to 180°. After removal of the tape, the coating around the "X" area is observed, and a value is given based on the following scale:

5—No peeling of coating removal
4—Trace peeling or removal along incisions or at the intersection
3—Jagged removal along incisions up to 1.6 mm on either side
2—Jagged removal along most of incisions up to 3.2 mm on either side
1—Removal from most of the area of the "X" under the tape
0—Removal beyond the area of the "X"

In all but one case (the PA12 where 6 measurements were made) at least 9 measurements were made, and the average reported.

The second test, ASTM D2794—Effects of Rapid Deformation of Coatings (Steel Punch Impact) is quantitative. The test employs a Gardner Impact Tester. Test specimens are conditioned for 24 hours at 23° C. and 50% R.H. prior to testing. The test specimen rests on a steel cylinder base. A steel punch rests on the top surface of the plaque. A 2-lb weight is dropped through a guide to impact the punch which in turn rapidly deforms the plaque. The force applied is varied by varying the height from which the 2-lb weight falls. The effect of the deformation can be seen on the coating of the impacted surface of the plaque (the "intrusion" side) or of the underside (the "extrusion" side) of the plaque. The maximum force where no visible cracking or delamination is observed, and the minimum force where some cracking or delamination is observed are recorded. Between 5 and 10 measurements were made for each sample, and the averages were reported.

In addition to the quantitative results described above, a semi-quantitative assessment of the surface of both sides of the plaque was made for each of the samples tested above according to the following rating system:

3—No cracking or delamination observed
2—Partial delamination, no crack through coating
1—Delamination surrounding the deformation, no crack through coating
0—Crack through coating Averages were reported.

Figure 1:
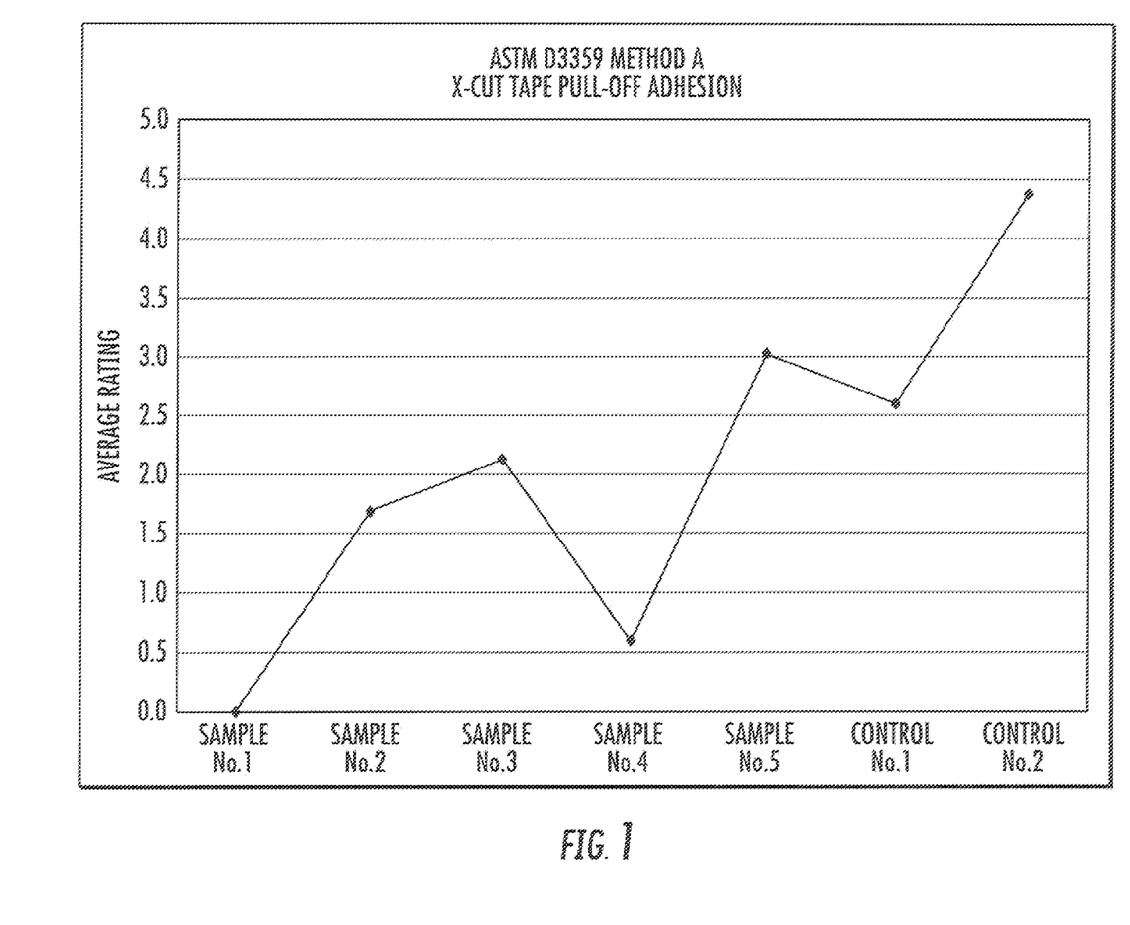
FIGS. 1, 2 and 3 are graphical representations of the results obtained in the example below.
Figure 2:
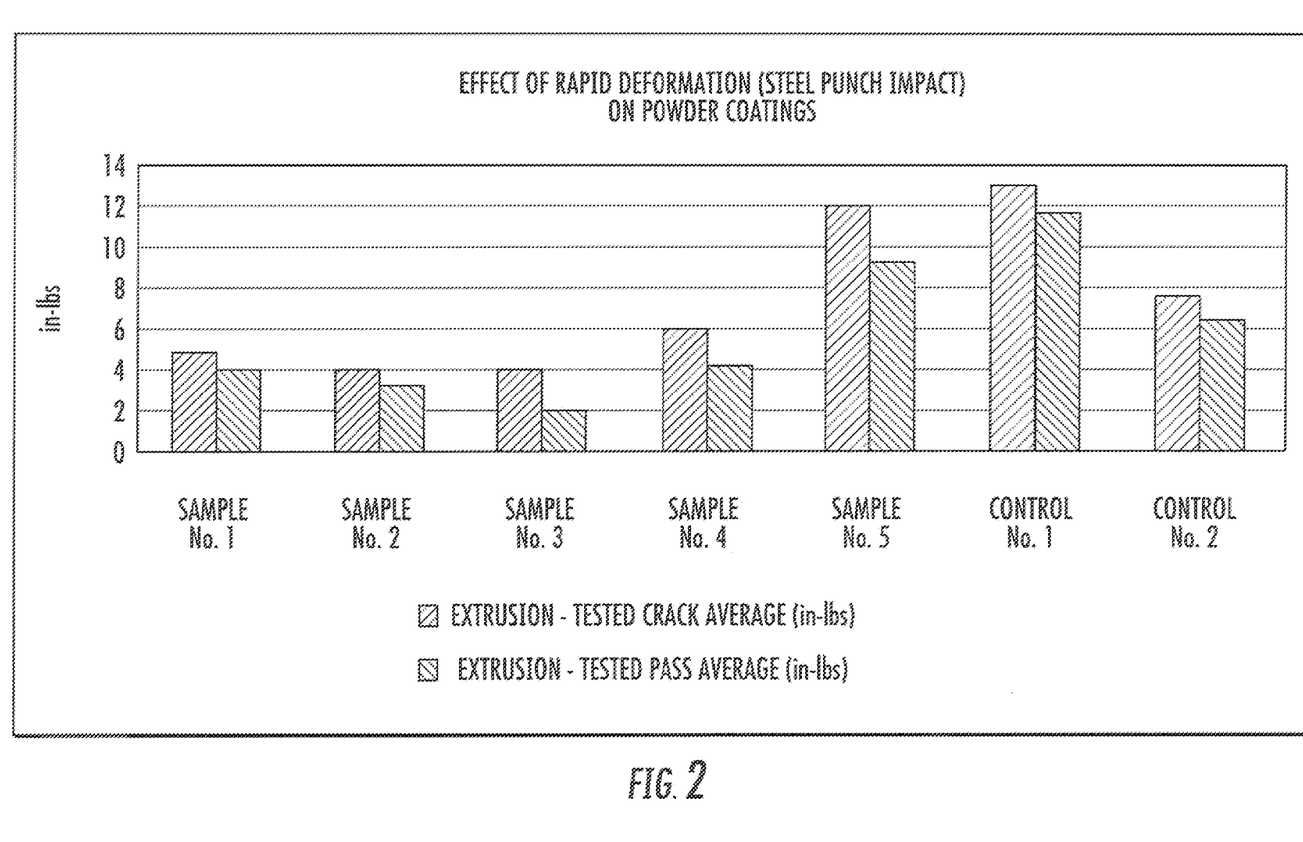
Figure 3:
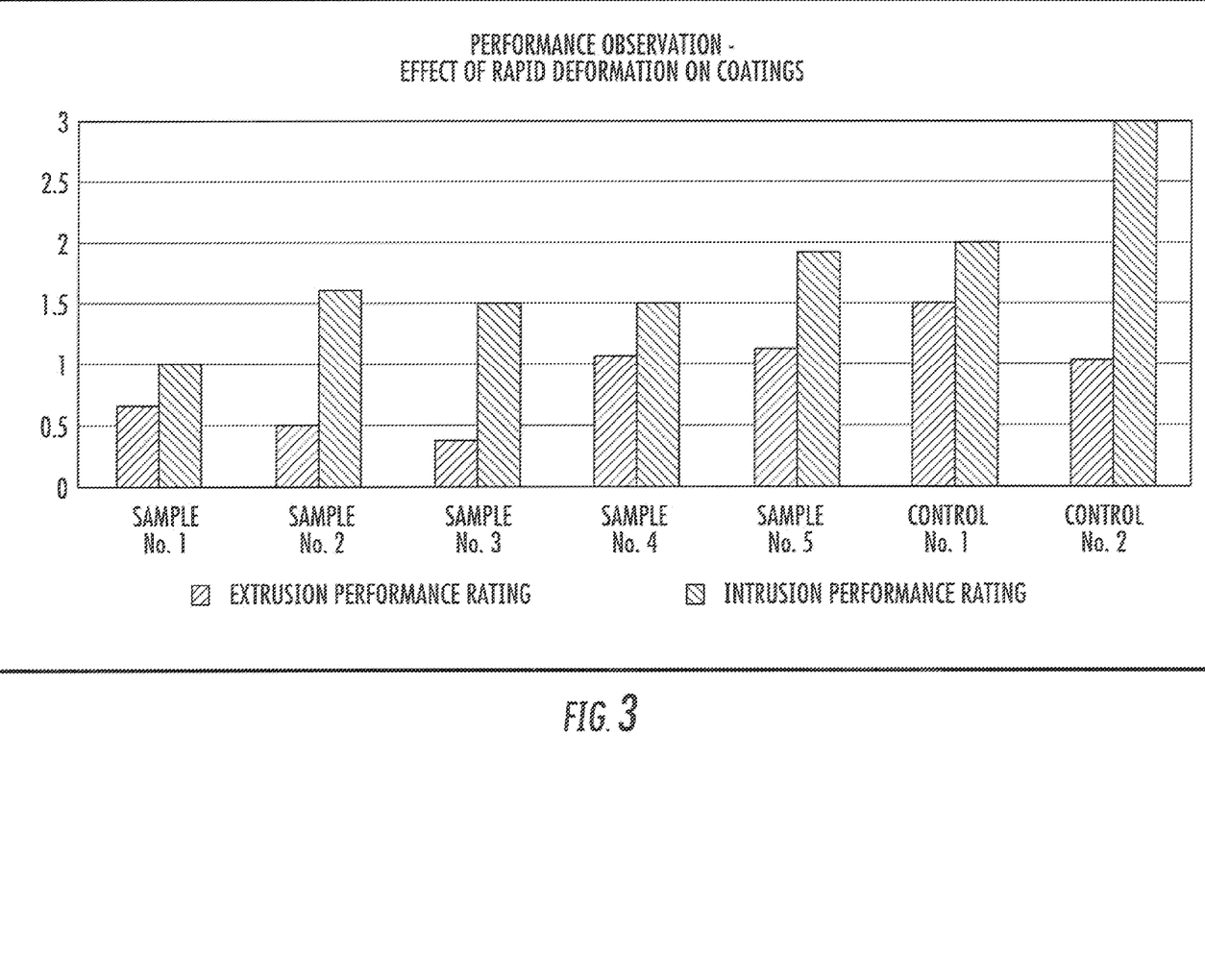

The results are shown in FIGS. 1, 2 and 3.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A powder well suited for powder coating metallic substrates comprising:
    polymeric particles having a particle size distribution such that at least about 80% of the particles have a particle size of from about 25 microns to about 300 microns, the polymeric particles comprising:
    (a) a polyoxymethylene polymer in which at least 50% of the terminal groups are hydroxyl groups;
    (b) a functional additive for decreasing stiffness, the functional additive being present in the polymeric particles in the amount of from about 5% by weight to about 50% by weight, the functional additive comprising, a polyamide 11 polymer obtained by condensation of 11-aminoundecanoic acid or lactam-11, a polyamide 12 polymer obtained by condensation of 12-aminododecanoic acid or lactam-12, a polyamide terpolymer, a polyamide copolymer comprising a polycondensation product of a polymeric fatty acid with an aliphatic diamine, or mixtures thereof; and
    optionally a coupling agent for coupling the polyoxymethylene polymer to the functional additive.

2. A powder as defined in claim 1, wherein the polymeric particles contain the coupling agent, the coupling agent comprising an isocyanate, the coupling agent being present in the polymeric particles in an amount from about 0.1% to about 1% by weight.

3. A powder as defined in claim 1, wherein at least 70% of the terminal groups of the polyoxymethylene polymer are hydroxyl groups.

4. A powder as defined in claim 1, wherein at least 80% of the terminal groups of the polyoxymethylene polymer are hydroxyl groups.

5. A powder as defined in claim 1, wherein an individual polymer chain of the polyoxymethylene polymer comprises between about 15 and about 20 hydroxyl groups.

6. A powder as defined in claim 1, wherein the polyoxymethylene polymer is present in the polymeric particles in an amount from about 60% to about 90% by weight.

7. A powder as defined in claim 1, wherein the functional additive comprises the polyamide 11 polymer or the polyamide 12 polymer, the functional additive being present in the polymeric particles in an amount of at least about 8% by weight.

8. A powder as defined in claim 7, wherein the polyamide 11 polymer or the polyamide 12 polymer comprise a condensation product of ricinoleic acid.

9. A powder as defined in claim 1, wherein the functional additive comprises the polyamide terpolymer, the terpolymer containing three or more repeat units of polyamide 6; polyamide 11; polyamide 12; polyamide 6,6; polyamide 6,9; polyamide 6,10; or polyamide 6,12.

10. A powder as defined in claim 1, wherein the polymeric particles are made from a polymeric composition having a tensile strength of less than about 2200 MPa and a shrinkage of less than about 1.8%.

11. A powder as defined in claim 1, wherein the particle size distribution of the polymeric particles is such that 90% of the particles have a size of from about 100 microns to about 250 microns.

12. A powder as defined in claim 1, wherein the polymeric particles have been cryogenically ground.

13. A powder as defined in claim 1, wherein the functional additive has a melting point of from about 150° C. to about 200° C., the functional additive being present in the polymeric particles in an amount from about 10% to about 30% by weight.

14. A metallic substrate coated with the powder defined in claim 1.

15. A process for coating a metallic substrate comprising:
    placing a heated metallic substrate into a fluidized bed, the fluidized bed containing fluidized polymeric particles, the polymeric particles comprising the particles defined in claim 1, the polymeric particles adhering and coating the metallic substrate.

16. A process as defined in claim 15, wherein after the coated metallic substrate is removed from the fluidized bed, the metallic substrate is further heated.

17. A powder well suited for powder coating metallic substrates comprising:
    polymeric particles having a particle size distribution such that at least about 80% of the particles have a particle size of from about 25 microns to about 300 microns, the polymeric particles comprising:
    (a) a polyoxymethylene polymer in which at least 50% of the terminal groups are hydroxyl groups;
    (b) a functional additive being present in the polymeric particles in the amount of from about 5% to about 50% by weight, the functional additive comprising thermoplastic elastomer; and
    (c) a coupling agent that couples the polyoxymethylene polymer to the functional additive.

18. A powder as defined in claim 17, wherein the thermoplastic elastomer comprises a thermoplastic polyurethane elastomer, the thermoplastic polyurethane elastomer being present in the polymeric particles in an amount from about 10% to about 30% by weight.

19. A powder as defined in claim 18, wherein the coupling agent comprises an isocyanate, the coupling agent being present in the polymeric particles in an amount from about 0.1% to about 1% by weight.

20. A powder as defined in claim 17, wherein the particle size distribution of the polymeric particles is such that 90% of the particles have a size of from about 100 microns to about 250 microns.

21. A process for coating a metallic substrate comprising:
    placing a heated metallic substrate into a fluidized bed, the fluidized bed containing fluidized polymeric particles, the polymeric particles comprising the particles defined in claim 17, the polymeric particles adhering and coating the metallic substrate.

* * * * *